(12) United States Patent
Porter et al.

(10) Patent No.: US 6,332,023 B1
(45) Date of Patent: Dec. 18, 2001

(54) METHOD OF AND SYSTEM FOR PROVIDING SERVICES IN A COMMUNICATIONS NETWORK

(75) Inventors: Kelvin Porter, Dallas; Carol Waller, Allen, both of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/089,890

(22) Filed: Jun. 4, 1998

(51) Int. Cl.[7] .................................................. H04M 3/00
(52) U.S. Cl. ........................ 379/242; 379/207; 379/229
(58) Field of Search ................................. 379/242, 219, 379/220, 221, 222, 229, 230, 243, 244, 245, 207

(56) References Cited

U.S. PATENT DOCUMENTS

| | | | |
|---|---|---|---|
| 4,685,125 | * 8/1987 | Zave | 364/130 |
| 4,713,806 | * 12/1987 | Oberlander et al. | 370/358 |
| 4,747,130 | 5/1988 | Ho | 379/269 |
| 5,226,075 | 7/1993 | Funk et al. | 379/243 |
| 5,455,821 | * 10/1995 | Schaeffer et al. | 370/332 |
| 5,603,085 | * 2/1997 | Shedlo | 455/450 |
| 5,694,463 | * 12/1997 | Christie et al. | 379/230 |
| 5,748,468 | * 5/1998 | Notenboom et al. | . |
| 5,781,624 | * 7/1998 | Mitra et al. | 379/244 |
| 5,787,160 | * 7/1998 | Chaney et al. | 379/220 |
| 5,818,921 | * 10/1998 | Vander Meiden et al. | 379/225 |
| 5,848,143 | * 12/1998 | Andrews et al. | 379/219 |
| 6,035,028 | * 3/2000 | Ward et al. | 379/207 |
| 6,134,433 | * 10/2000 | Joong et al. | 455/417 |
| 6,144,647 | * 11/2000 | Lopez-Torres | 370/329 |
| 6,169,735 | * 1/2001 | Allen, Jr. et al. | 370/352 |
| 6,175,618 | * 1/2001 | Shah et al. | 379/201 |
| 6,181,703 | * 1/2001 | Christie et al. | 370/410 |

* cited by examiner

*Primary Examiner*—Ahmad Matar
*Assistant Examiner*—Benny Q. Tieu

(57) ABSTRACT

A system for providing services in a communications network includes a service processing function, a universal directory function, and a nodal resource manager. The service processing function receives service requests, formulates requests for interworking functions based upon service requests, and formulates resource requests based upon service requests and interworking functions. The universal directory function receives addresses from the service processing function and returns interworking functions based upon addresses. The nodal resource manager receives resource requests and allocates resources to the service processing function in response to resource requests. The nodal resource manager maintains a resource database that includes an entry corresponding to each network resource managed by the nodal resource manager.

21 Claims, 5 Drawing Sheets

METHOD OF AND SYSTEM FOR PROVIDING SERVICES IN A COMMUNICATIONS NETWORK

FIELD OF THE INVENTION

The present invention relates generally to methods and systems for providing services in communications networks, and more particularly to a method of and system for processing requests for services in a telecommunications network.

DESCRIPTION OF THE PRIOR ART

In the public switched telephone network, calls among subscribers who are connected to different end offices are routed via trunk lines, and sometimes through intermediate tandem switching offices and interexchange switches as well. Traditionally, a call is routed based upon a portion of the dialed number. For example, in the United States, a local dialed number consists of seven digits, of which the first three digits (the so-called "NXX" portion) identifies the destination exchange.

When a caller picks up a telephone receiver, the caller becomes actively connected to an end office, as evidenced by a dial tone. After a caller dials a destination telephone number, the end office receiving the digits, i.e., the originating exchange, examines the dialed number to extract the destination exchange. If the destination exchange is different from the originating exchange, the call must be routed toward the destination exchange over one of the many trunk groups connected to the originating exchange. In order to direct a call along an appropriate trunk group leading to the correct destination exchange, a routing table is configured within each switch. The routing table contains a preset list of trunk groups pertaining to each destination exchange. The routing table is consulted to map the logical intent of reaching the destination number through the physical reality of which trunk lines connect to which other switches.

Commonly, the routing table contains an ordered list of preferred and alternate trunk groups for each destination exchange. For example, a preferred trunk group may be those directly connected to the destination exchange whereas alternate trunk groups might connect indirectly through tandem switches. In the course of routing a call, a preferred trunk group will be searched first for an available line and channel. If no available lines and channels are found within the preferred trunk group, then an alternate trunk group will be searched for available lines. A fixed number of trunk groups is searched in the preference order recorded in the routing table.

The contents of each routing table and each switch in a network is dependent upon the topology of the network and must be changed if nodes are added, deleted, or logically rearranged. Moreover, the routing tables are interpreted locally and populated differently for each switch. Changes must be coordinated among all switches to keep the network functioning properly. Any time an NXX or switch is added or the telephone network is otherwise logically rearranged, then the contents of every routing table and every switch in every network must be updated in a coordinated fashion. In the U.S., a private sector entity maintains a local exchange routing guide upon which all network owners base their routing tables.

Although the traditional routing table approach has sufficed for traditional telephone use under normal conditions, it has become inadequate to accommodate new types of services and traffic. The traditional routing table approach is based upon the assumptions of slow change and network configuration and homogeneity among both traffic types and network paths. More specifically, the traditional routing table approach is inflexible. The traditional routing table approach is cumbersome to maintain and it cannot accommodate rapid changes in the network configuration, such as those arising from network growth, or sudden changes in traffic, such as those arising from emergencies and the like. The traditional routing table approach does not provide an opportunity to perform intelligent routing on a per-call basis and it cannot take into account other factors such as class of services, bandwidth, or priority associated with the originator or the network service being invoked. Instead, the route selection algorithm is implicit in the routing tables and is specified in a very constrained manner by the organization of data in the tables. Moreover, the traditional routing table approach does not lend itself to the rapid implementation of new services.

U.S. Pat. No. 5,226,075 discloses a method and apparatus by which a telephone call is routed differently through an interexchange network based upon called number, calling number, and origination data such as a requested class of service. A database is used to map these parameters into a destination switch number. A call might be routed differently, even to different terminating switches, based upon the dialed number or, at best, a bandwidth or quality level as inferred for a given call. The system of the '075 patent is directed by the relatively fixed contents of database tables. The database tables take into account only a few origination parameters, can choose only from a relatively few different paths, and can take actions only as preplanned by whoever populates the database tables. Changes to the physical network may require re-engineering of the contents of the tables.

The approach of the '075 patent cannot optimize the path subject to instantaneous changes in the network or based upon per-resource cost metrics. More generally, the '075 patent continues to confound service and addressing functions within a single database. As in traditional telephony, there is no recognition of the need to segregate service logic and addressing data. Furthermore, the approach of the '075 patent cannot effectively serve new types of traffic or services that may require flexible allocation of intervening resources, such as store-and-forward devices.

There is a need for a flexible routing technique in a telecommunications network that encompasses more than a fixed mapping of numbers to trunk groups, or a fixed mapping of origination information to network resources. A new routing technique is required that takes into account many factors in routing a call and it can be applied in a multi-purpose communications network, rather than just for telephony.

SUMMARY OF THE INVENTION

The present invention provides a method of and a system for providing services in a communications network. The system includes a service processing function, a universal directory function, and a resource manager. The service processing function receives service requests, formulates requests for interworking functions based upon service requests, and formulates resource requests based upon service requests and interworking functions. The universal directory function receives logical addresses from the service processing function and returns interworking functions based upon addresses. The resource manager receives resource requests and allocates resources to the service processing function in response to resource requests. The resource manager accesses and updates a resource database that includes an entry corresponding to each network resource managed by the resource manager.

Each entry of the resource database includes a resource identifier, a set of static attributes, and a set of dynamic attributes. A resource identifier uniquely identifies a resource. Static attributes are relatively stable data about the type and configuration of the resource. Dynamic attributes are changing data about the resource that are tracked by the resource manager, including such data as whether the resource is being used, and if so, by whom. If a resource is allocated, the dynamic attribute of the resources will include an indicator on how to find the priority of the allocation. This is because the priority of an allocation could be dynamic, i.e., the function owning a resource may assign varying priority during the duration of the allocation, or static, i.e., the priority is determined at allocation time and is fixed, so that it can be stored in the resource.

A resource request includes a selection function. The resource manager uses the selection function to search the attributes of the resource database to locate a set of candidate resources. The selection function may be used to search both the static attributes and the dynamic attributes. A selection function preferably includes a priority criterion, which indicates the priority level assigned to the request or requester. If the requestor's priority criterion is higher than the priority attribute of an allocated resource, that resource is deemed to be eligible for selection.

A resource request also includes an evaluation function. The resource manager uses the evaluation function to evaluate the attributes of the set of candidate resources to determine a best candidate resource. The resource manager sorts or ranks the candidate resources according to the evaluation function. The resource manager allocates the best candidate resource to the requesting service processing function and indicates the identity and priority of the requesting service processing function. The resource manager then configures the best candidate in preparation for fulfilling the request.

Preferably, the evaluation function ranks unallocated candidate resources higher than allocated candidate resources. However, occasionally the best candidate may already be allocated to a lower priority service processing function. In those situations, the resource manager de-allocates the best candidate resource and notifies the earlier service processing function that its use of the resource has been preempted. Then the resource manager reconfigures the resource and allocates the resource to the higher priority service processing function.

Every resource manager has a domain, which is the set of resources managed by the resource manager. The domain of a nodal resource manager is the set of resources available to a network node, as the network is currently configured. The system of the present invention may include a network resource manager, whose domain is all connective resources of the network. The network resource manager can reconfigure the network and allocate additional network resources to a nodal resource manager. In the event a nodal resource manager cannot satisfy a resource request, the nodal resource manager may request additional resources from the network resource manager.

DESCRIPTION OF THE PREFERRED EMBODIMENT

Figure 1:
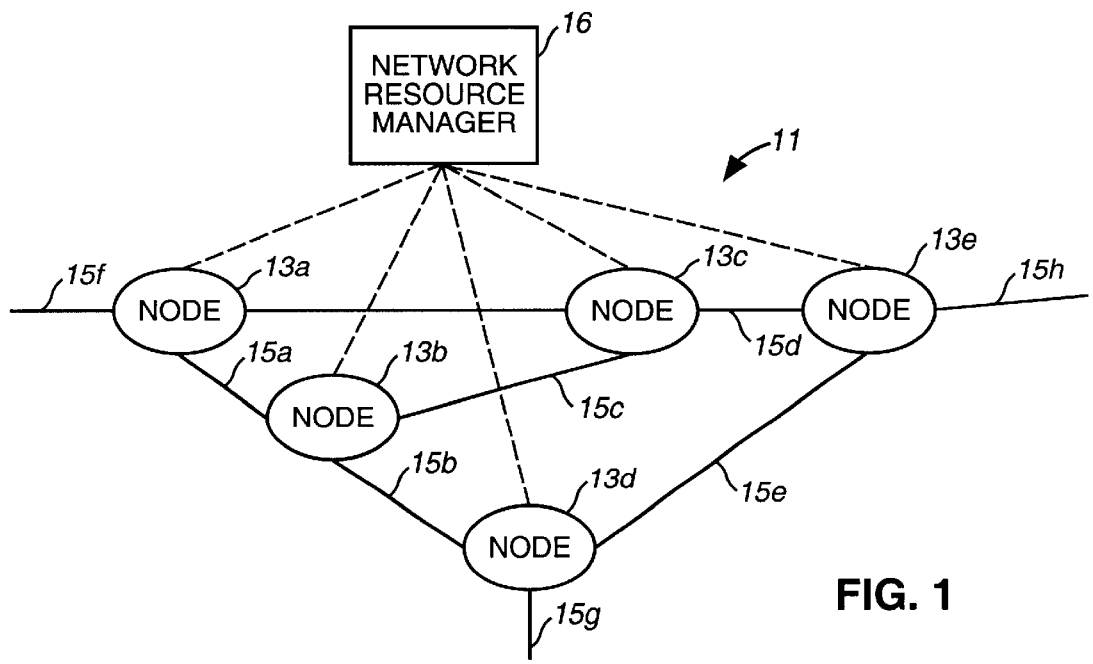
FIG. 1 is a block diagram of a communications network according to the present invention.

Referring now to the drawings, and first to FIG. 1, a portion of a network is designated generally by the numeral 11. Network 11 includes a plurality of nodes 13 interconnected by links 15. As is well known to those skilled in the art, network services, such as the completion of telephone calls, are provided by switching traffic between nodes 13 over selected links 15. Network 11 also includes a network resource manager 16 that can reconfigure network 11 and allocate additional resource to the domain of each node 13, as will be described in detail hereinafter.

Figure 2:
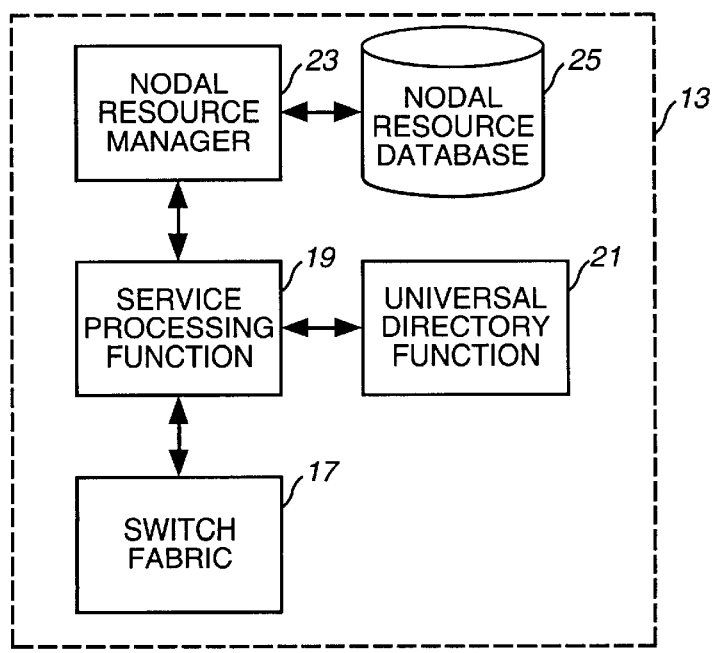
FIG. 2 is a block diagram of a network node according to the present invention.

Referring now to the FIG. 2, a node, according to the present invention, includes a switch fabric 17. A service processing function 19 is adapted to process requests for services, such as telephone calls and instruct switch fabric 17 how to make the connections necessary to fulfill the request for service. A universal directory function 21, which may located on the node or associated with the network resource manager 16, contains a mapping of all types of logical addresses to physical elements within network 11. For example, if the universal directory function 21 is asked for a terminating call half and is given an telephone number, then it returns a normal telephony interworking function and a terminating node address; if the universal directory function 21 is given an IP address, then the universal directory function returns a IP-telephony interworking function and the configuration information to make the connection. When service processing function 19 receives a request for services that requires a connection, it consults universal directory function 21 to obtain a meaningful physical address as well as necessary configuration information.

Node 13 includes a nodal resource manager 23. Nodal resource manager 23 serves as the only gate keeper to all of the resources belonging to its particular domain. The domain of nodal resource manager 23 is determined by the configuration of network 11. According to the present invention, node resources include all communication ports, and devices, such as voice response units, store and forward devices, multiplexers, modems, and the like, that are used in providing network services. Network services are provided by allocating and configuring appropriate network resources.

The resources of the domain managed by nodal resource manager 23 are tracked in a nodal resource database 25. Each resource within the domain of nodal resource manager 23 is identified by a resource identifier, which uniquely identifies an individual resource. The attributes of each resource includes static attributes, which are relatively stable data about the configuration of the resource, including the type of resource and the capabilities of the resource. The attributes of each resource also include dynamic attributes, which are changing information about the resource that is tracked by the nodal resource manager, such as whether the resource is in service or out of service, available for use, or in use, and by whom.

According to the present invention, the provision of network services, such as routing, occurs as an interaction among service processing function 19, universal directory function 21, and nodal resource manager 23. Rather than having service and addressing mixed together and hard coded within tables, the present invention provides services by allocating network resources in response to user requests. In the preferred embodiment, a prioritization scheme is applied to all network resources and to all user requests. The prioritization scheme allows for the displacement of low priority requests in favor of high priority requests, only when warranted and with consideration for the collective costs involved. Thus, low priority traffic may be preempted in order to make capacity available for high priority traffic. The prioritization scheme of the present invention thus allows radical reconfiguration of the network in the event of natural disasters and the like.

Figure 3:
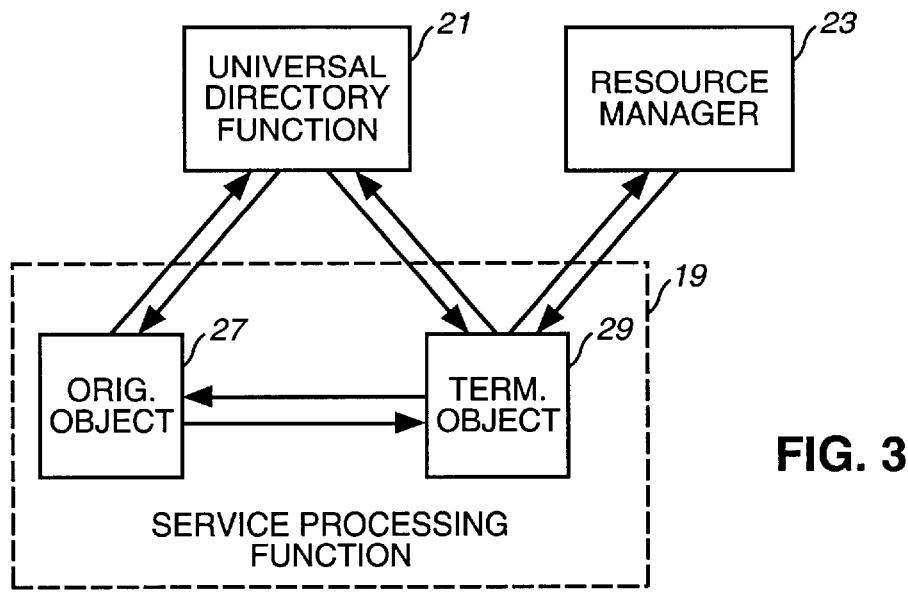
FIG. 3 is a functional diagram of the messaging among objects according to the present invention.

As shown in FIG. 3, the system of the present invention is preferably implemented using object oriented technology. When an originating object 27 of service processing function 19 receives a request for service and determines that it needs to correspond with another service of a particular type to perform a specified function, originating object 27 dispatches a request to universal directory function 21 for a terminating object of that particular type. Universal directory function 21, using an algorithm and stored data, either locates or instantiates a terminating object 29 of that type and sends a configuration message to terminating object 29. Terminating object 29 receives the configuration event and determines whether it needs any resources to perform its duties. The terminating object may not need resources if, for example, the service does not require connection to another node of the network. If terminating object 29 needs a resource or resources, then it synthesizes a resource request.

A resource request may be either a singular resource request or a composite resource request. A singular resource request is made when only a single resource is needed to provide the requested service. A composite resource request is used when a set of resources is required to accomplish the intended task. There are many situations in which two or more resources are required to provide a particular service. Only one resource without the other is useless. Allocating resources one by one can lead to deadlocks and composite resource requests avoid the deadlock problem by preventing contention among partially allocated requests.

A resource request is composed of a number of parameters, some of which may be simple values and others of which may be algorithms. A resource request includes a selection function, which nodal resource manager 23 uses to select a set of candidate resources. The selection function preferably includes a priority criterion so that nodal resource manager 23 may select lower priority resources as candidate resources. A selection request also includes an evaluation function, which nodal resource manager 23 uses to sort or rank the candidates to find a best candidate resource. The evaluation function may also include a sufficiency criterion so that resource manager does not continue to search after finding a candidate resource that is good enough to satisfy the request. A resource request finally includes the identity of the requestor and a queuing duration, which specifies how long a nodal resource manager may search for a best candidate resource.

Terminating object 29 dispatches a resource request to nodal resource manager 23. Nodal resource manager 23 executes the selection and evaluation functions and returns a result to terminating object 29. The result is either that the resource or resources were or were not allocated. Terminating object 29 completes its configuration based upon the result received from nodal resource manager 23. After configuration, terminating object 29 notifies the universal directory function 21 that it has completed configuration and universal directory function 21 returns the identity of terminating object 29 to originating object 27. At this point, originating object 27 and terminating object 29 can start exchanging events necessary to provide the requested service.

Figure 4A:
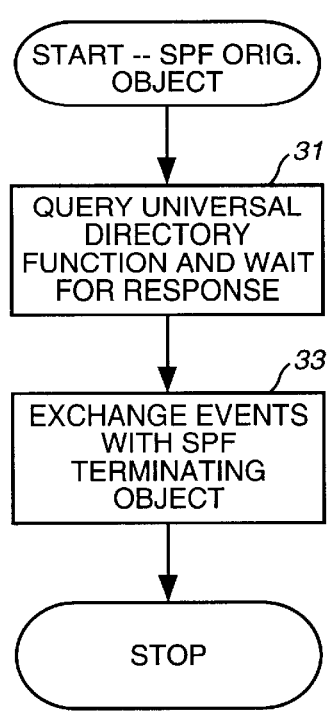
FIGS. 4A and 4B are flowcharts of service processing function originating object and terminating object processing, respectively, according to the present invention.
Figure 4B:
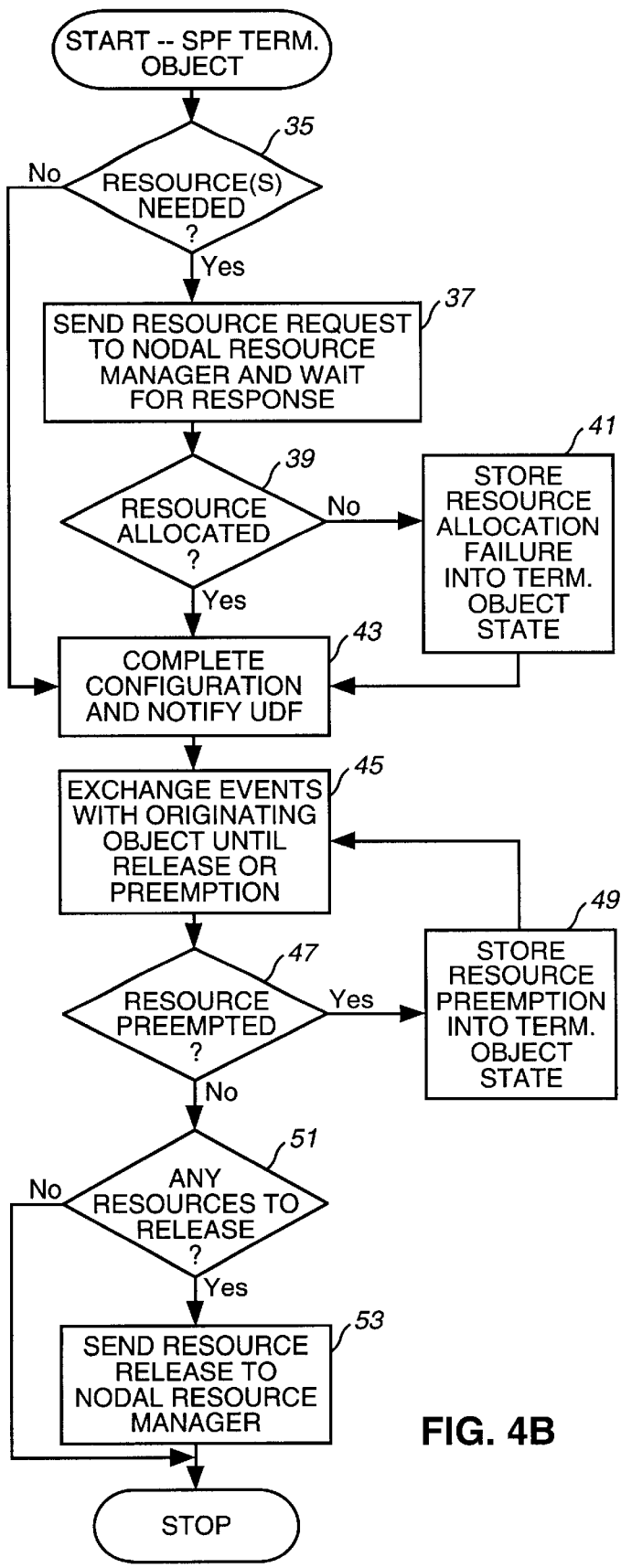

Referring now to FIGS. 4A and 4B, there is shown a high level flow chart of service processing function processing. The service processing function is preferably implemented in object oriented technology. Referring first to FIG. 4A, upon receiving a request for services that requires a connection, the originating object queries the universal directory function and waits for a response, at block 31. When the service processing function originating object receives a response from the universal directory function, the originating object exchanges events with the appropriate service processing function terminating object, the identity of which is returned from the universal directory function, until the requested service is completed, at block 33.

Referring now to FIG. 4B, there is shown a flow chart of service processing function terminating object processing. As will be explained in detail hereinafter, a service processing function terminating object is located or instantiated by the universal directory function. Upon instantiation, the terminating object determines, at decision block 35, if any resources are needed to perform the requested service. If so, the terminating object sends a resource request to the nodal resource manager and waits for a response, at block 37. If, at decision block 39, the resource is allocated, then the terminating object completes configuration and notifies the universal directory function that it is ready to exchange events with the originating object, at block 43. If, at decision block 39, the requested resource is not allocated, then the terminating object stores the resource allocation failure into its object state, at block 41, and processing continues at block 43. Then, at block 45, the terminating object exchanges events with the originating object until release or preemption. If, at decision block 47, a resource necessary to the services preempted, then the terminating object stores the resource preemption into its object state, at block 49, and processing continues at block 45. If, at decision block 51, any resource needs to be released, then the terminating object sends a resource release message to the nodal resource manager, at block 53, and processing ends. If, at decision block 51, no resources need to be released, terminating object processing ends.

Figure 5:
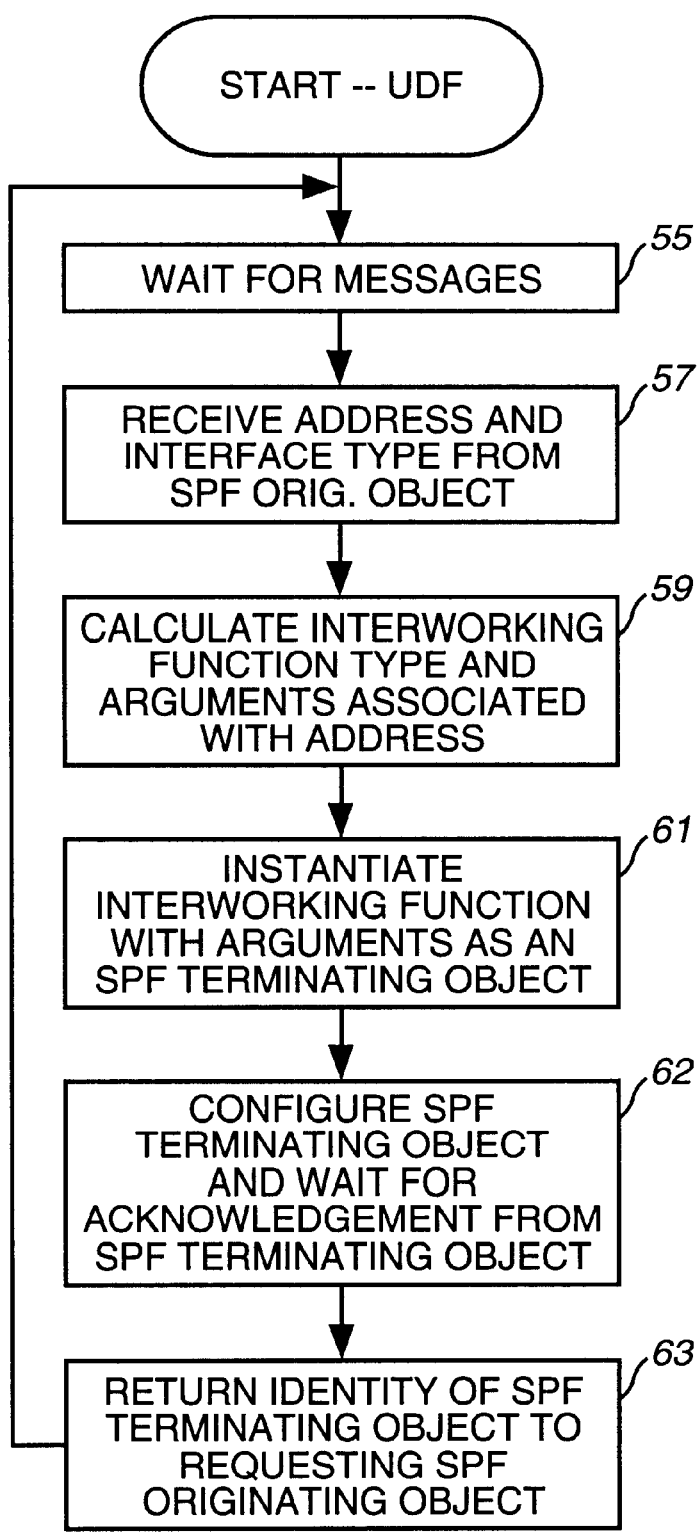
FIG. 5 is a flowchart of universal directory function processing according to the present invention.

Referring now to FIG. 5, there is shown a high level flow chart of processing by the universal directory function. The universal directory function waits for messages, at block 55. When, at block 57, the universal directory function receives an address from a service processing function originating object, the universal directory function calculates an interworking function type and arguments associated with the address, at block 59. An interworking function represents operative access to the actual physical resources in the network packaged and presented through a specified interface type. Then, the universal directory function instantiates the interworking function with arguments as a service processing function terminating object, at block 61. The universal directory function configures the terminating object and waits for an acknowledgment, at block 62. When the universal directory function receives acknowledgment from the terminating object, the universal directory function returns the identity of the terminating object to the requesting service processing function originating object, at block 63, and returns to block 55 to wait for messages.

Figure 6:
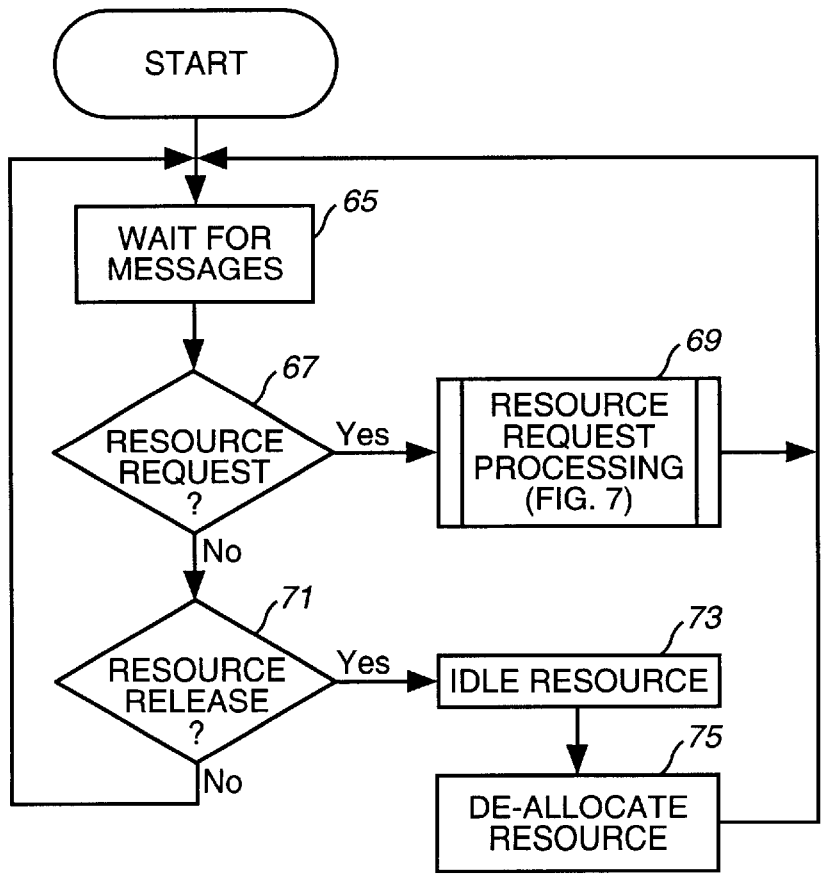
FIG. 6 is a flowchart of resource manager processing according to the present invention.

Referring now to FIG. 6, there is shown a high level flow chart of nodal resource manager processing according to the present invention. The nodal resource manager waits for messages, at block 65. If, at decision block 67, a message is a resource request, the nodal resource manager performs resource request processing, as indicated generally at block 69 and shown in detail with respect to FIG. 7. If, at decision block 71, the message is a resource release, then the nodal resource manager returns the released resource to an idle state, at block 73 and deallocates the resource, at block 75. Deallocation of a resource includes the step of setting the resources in use attribute to available.

Figure 7:
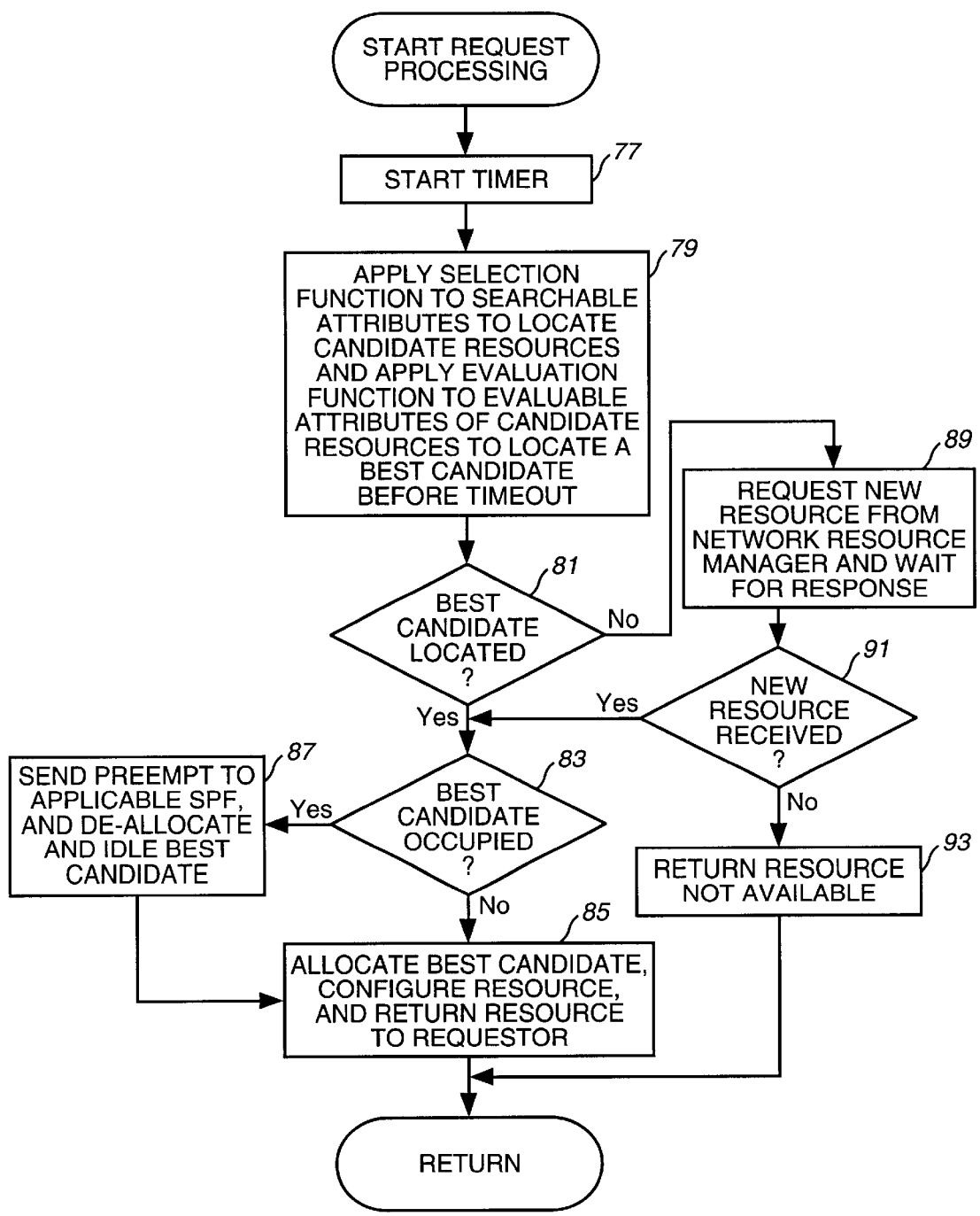
FIG. 7 is a flowchart of resource request processing of FIG. 6.

Referring now to FIG. 7, there is shown a flow chart of nodal resource manager resource request processing, which is indicated generally at block 69 in FIG. 6. The nodal resource manager starts a timer according to the queuing duration parameter of the resource request, at block 77. Then, the nodal resource manager applies the selection function of the resource request to the searchable attributes in the resource database and applies the evaluation criteria of the resource request to the evaluable attributes of candidate resources to locate a best candidate resource before the timer times out, at block 79.

Block 79 processing may be performed in a serial fashion in which the selection function is applied to locate a set of all candidate resources and then the evaluation function is applied to the set of candidate resources to locate a best candidate resource. Alternatively, block 79 processing may be performed in a parallel fashion in which the evaluation function is applied as candidate resources are located according to the selection function. Preferably, the resource request includes a sufficiency criterion, which defines a minimum acceptable level for a best candidate. When the resource manager finds a candidate resource that satisfies the sufficiency criterion, that candidate resource is declared to be the best candidate and block 79 processing ends. Block 79 processing continues until a best candidate is found or the timer times out.

The nodal resource manager determines, at decision block 81, if a best candidate has been located. If so, the nodal resource manager tests, at decision block 83, if the best candidate is already allocated. If not, the nodal resource manager allocates and configures the best candidate resource and returns the resource to the requesting service processing function terminating object, at block 85. If, at decision block 83, the best candidate resource is already allocated, then the nodal resource manager sends a preempt message to the applicable service processing function terminating object, and deallocates and idles the best candidate resource, at block 87. Then, processing continues at block 85.

If, at decision block 81, the nodal resource manager does not locate a best candidate, then the nodal resource manager requests a new resource from the network resource manager and waits for response, at block 89. If, at decision block 91, a new resource is received, then processing continues at decision block 83. If, at decision block 91, a new resource is not received, then the nodal resource manager sends a resource not available message to the applicable service processing function terminating object, at block 93.

From the foregoing it may be seen that the method and system of the present invention are well adapted to overcome the shortcomings of the prior art. Additional resources can be added to the network without having to recode routing tables. A service architect can design and implement a new service by writing a new service processing function that specifies the necessary resources, without know the identity of specific resources. Thus, the present invention enables new services to be provided quickly with a minimum of recoding. For example, new service may be created based upon different priorities. The prioritization scheme of the present invention allows network resources to be dynamically reserved.

What is claimed is:

1. A system for providing services in a communications network, which comprises:
   a service processing function, said service processing function having means for receiving service requests, formulating requests for interworking functions based upon service requests, and formulating resource requests based upon service requests and interworking functions;
   a universal directory function, said universal directory function having means for receiving addresses and returning interworking functions based upon addresses;
   a nodal resource manager having means for receiving resource requests and allocating resources to said service processing function in response to resource requests; and,
   a resource data structure accessible by said nodal resource manager, said resource data structure including an entry corresponding to each network resource available to said nodal resource manager.

2. The system as claimed in claim 1, wherein each entry of said resource data structure includes a resource identifier, a set of static attributes, and a set of dynamic attributes.

3. The system as claimed in claim 2, wherein said resource request includes:
   a selection function, said selection function being used by said nodal resource manager to search the attributes of said resource data structure to locate a set of candidate resources.

4. The system as claimed in claim 3, wherein said dynamic attributes include a free/in-use attribute.

5. The system as claimed in claim 4, wherein said in-use attribute includes a priority identifier.

6. The system as claimed in claim 5, wherein said priority identifier is a reference to a priority attribute.

7. The system as claimed in claim 5, wherein said priority identifier is a priority attribute.

8. The system as claimed in claim 5, wherein said selection function includes a priority designation, whereby resources with a priority attribute identified by said priority identifier less than the priority designation of said selection function are selectable.

9. The system as claimed in claim 8, wherein said resource request includes:
   an evaluation function, said evaluation function being used by said nodal resource manager to evaluate the attributes of said set of candidate resources to determine a best candidate resource.

10. The system as claimed in claim 9, wherein said nodal resource manager includes means for de-allocating a best candidate resource with a priority attribute less than the priority designation of said selection function.

11. The system as claimed in claim 9, wherein said nodal resource manager includes means for setting the priority attribute of an allocated resource to the priority designation of the resource request that the resource is allocated in response to.

12. The system as claimed in claim 3, wherein said resource request includes:
an evaluation function, said evaluation function being used by said nodal resource manager to evaluate the attributes of said set of candidate resources to determine a best candidate resource.

13. The system as claimed in claim 1, wherein said nodal resource manager includes means for configuring an allocated resource.

14. The system as claimed in claim 1, wherein:
said service processing function includes means for sending a release message to said nodal resource manager; and,
said nodal resource manager includes means for de-allocating an allocated resource in response to a release message.

15. The system as claimed in claim 13, wherein said nodal resource manager includes means for idling a de-allocated resource.

16. The system as claimed in claim 1, including a network resource manager, said network resource manager including means for allocating additional network resources to said nodal resource manager, and wherein said nodal resource manager includes means for requesting additional resources in the event no resource in said resource data structure is available to satisfy a resource request.

17. A system for providing services in a communications network, which comprises:
a service processing function, said service processing function having means for receiving service requests, means for formulating requests for interworking functions based upon service requests, said requests for interworking functions including addresses, and means for formulating resource requests based upon service requests and interworking functions, each said resource request including a selection function for selecting a set of candidate resource and an evaluation function for selecting a best candidate resource;

a universal directory function, said universal directory function having means for receiving requests for interworking functions and returning interworking functions based upon addresses;

a nodal resource manager having means for receiving resource requests and allocating resources to said service processing function in response to resource requests; and, a resource data structure accessible by said nodal resource manager, said resource data structure including an entry corresponding to each network resource available to said nodal resource manager, each said entry including a resource identifier, a set of static attributes, and a set of dynamic attributes.

18. The system as claimed in claim 17, wherein said dynamic attributes include a free/in-use attribute.

19. The system as claimed in claim 18, wherein said in-use attribute includes a priority identifier.

20. The system as claimed in claim 19, wherein said selection function includes a priority designation, whereby resources with a priority attribute identified by said priority identifier that is less than the priority designation of said selection function are selectable.

21. The system as claimed in claim 20, wherein said nodal resource manager includes means for de-allocating a best candidate resource with a priority attribute less than the priority designation of said selection function.

* * * * *